(12) United States Patent
Jaradi et al.

(10) Patent No.: US 10,464,521 B2
(45) Date of Patent: Nov. 5, 2019

(54) SEATBELT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/787,668

(22) Filed: Oct. 18, 2017

(65) Prior Publication Data

US 2019/0111886 A1 Apr. 18, 2019

(51) Int. Cl.
*B60R 22/18* (2006.01)

(52) U.S. Cl.
CPC ...... *B60R 22/18* (2013.01); *B60R 2022/1806* (2013.01)

(58) Field of Classification Search
CPC ............ B60R 22/18; B60R 2022/1806; B60R 2022/1812
See application file for complete search history.

(56) References Cited

U.S. PATENT DOCUMENTS

| | | | | | |
|---|---|---|---|---|---|
| 3,233,941 A | * | 2/1966 | Selzer | ................ | A44B 11/2526 24/579.11 |
| 3,369,842 A | * | 2/1968 | Adams | ................ | A44B 11/2549 24/196 |
| 3,542,426 A | * | 11/1970 | Radke | ................ | A44B 11/2549 24/165 |
| 3,600,768 A | * | 8/1971 | Romanzi | ............ | A44B 11/2511 24/579.11 |
| 3,790,209 A | * | 2/1974 | Littmann | ........... | A44B 11/2549 297/483 |
| 3,845,524 A | * | 11/1974 | Hull | ....................... | B60R 22/30 24/546 |
| 3,885,811 A | * | 5/1975 | Takada | ............... | A44B 11/2549 24/579.11 |
| 3,994,513 A | * | 11/1976 | Courtis | .................. | B60R 22/18 280/808 |
| 4,334,701 A | * | 6/1982 | Takada | ................... | B60R 22/04 280/804 |

(Continued)

FOREIGN PATENT DOCUMENTS

| | | | | | |
|---|---|---|---|---|---|
| DE | 102012014796 A1 | * | 1/2014 | ............ | B60R 22/12 |
| JP | 52016737 A | * | 2/1977 | ............ | A44B 11/10 |

OTHER PUBLICATIONS

Yamada et al., Tongue Plate Mechanism of Safety Seat Belt, Feb. 8, 1977, JPO, JP 52-016737 A, Machine Translation of Description (Year: 1977).*

(Continued)

*Primary Examiner* — James A English
(74) *Attorney, Agent, or Firm* — Frank A. MacKenzie; Bejin Bieneman PLC

(57) ABSTRACT

A seatbelt assembly includes a first webbing, a first plate attached to the first webbing, a second plate rotatably and irremovably coupled to the first plate, and a second webbing attached to the second plate. The seatbelt assembly may include a spring attached to the first plate and to the second plate.

19 Claims, 8 Drawing Sheets

(56) References Cited

U.S. PATENT DOCUMENTS

| | | | |
|---|---|---|---|
| 4,915,413 A * | 4/1990 | Meyer | A44B 11/2549 24/628 |
| 5,605,380 A | 2/1997 | Gerstenberger et al. | |
| 6,334,628 B1 | 1/2002 | Newball et al. | |
| 6,842,952 B1 * | 1/2005 | Gilbert | A44B 11/2549 24/170 |
| 6,871,876 B2 | 3/2005 | Xu | |
| 6,921,136 B2 | 7/2005 | Bell et al. | |
| 7,988,196 B2 | 8/2011 | Wang | |
| 8,840,145 B2 | 9/2014 | Bougher et al. | |
| 2004/0155451 A1 * | 8/2004 | Xu | A44B 11/2549 280/808 |
| 2015/0115588 A1 * | 4/2015 | Storck | B60R 22/26 280/801.1 |

OTHER PUBLICATIONS

Carsten Moeker, Belt closure for safety belt system in motor vehicle, has belt retainers, in which belt ends are articulated at pivot axes around lap belt straps, where pivot axes are inclined with one another at right angle, Jan. 30, 2014, EPO, DE 102012014796 A1, Machine Translation of Description (Year: 2012).*

Carsten Moeker, Belt closure for safety belt system in motor vehicle, has belt retainers, in which belt ends are articulated at pivot axes around lap belt straps, where pivot axes are inclined with one another at right angle, Jan. 30, 2014, EPO, DE 102012014796 A1, English Abstract (Year: 2012).*

* cited by examiner

SEATBELT

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A tongue slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

Figure 1:
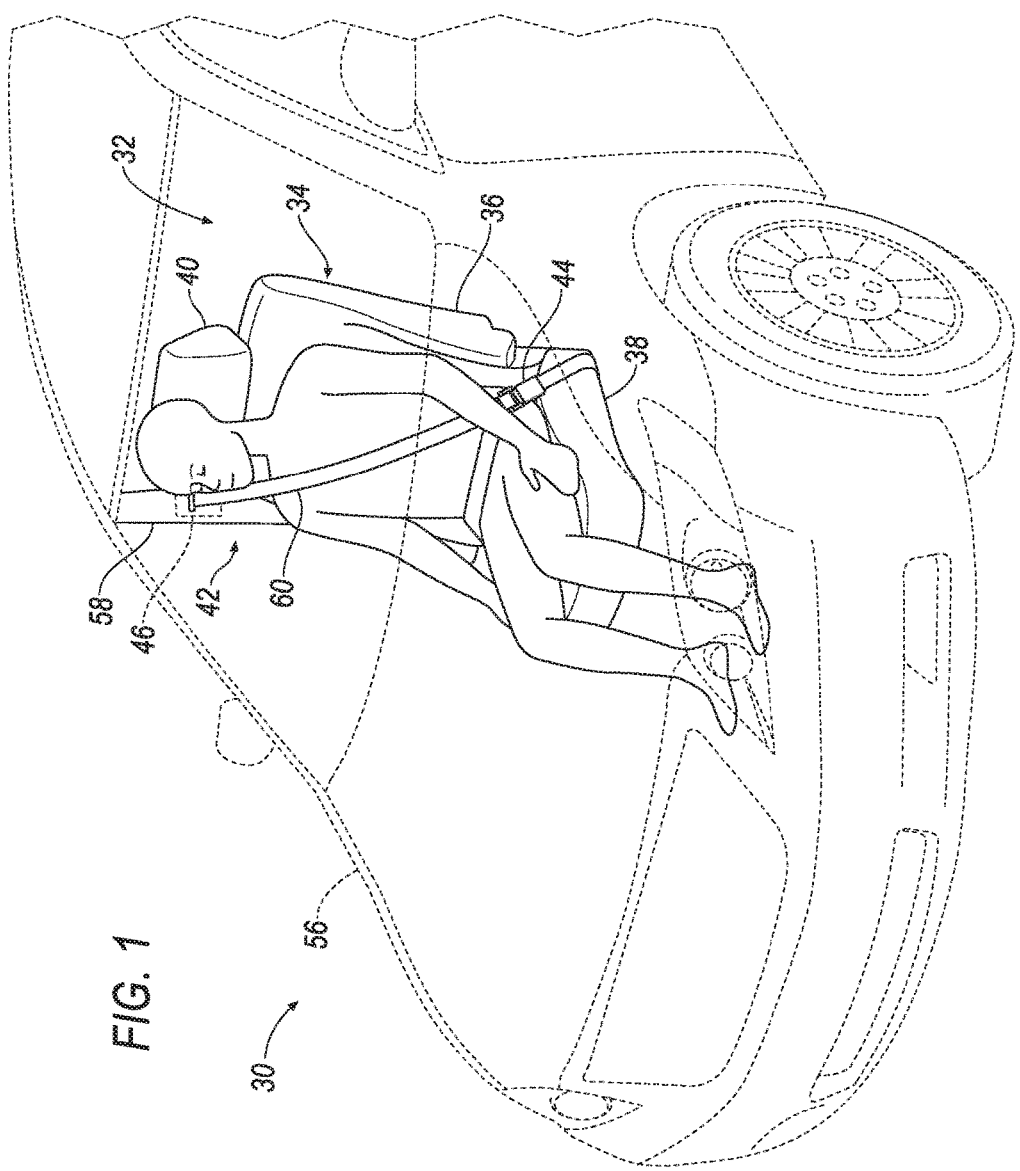
FIG. 1 is a perspective view of a vehicle including a seat.

A seatbelt assembly includes a first webbing, a first plate attached to the first webbing, a second plate rotatably and irremovably coupled to the first plate, and a second webbing attached to the second plate.

The seatbelt assembly may include a spring attached to the first plate and to the second plate. The spring may be a torsional spring.

The seatbelt assembly may include a pin rotatably coupling the first plate and the second plate. The first plate may include a hole, the pin may extend through the hole, the pin may include a head disposed on an opposite side of the first plate from the second plate, and the head may be wider than a widest width of the hole.

A spring may be coiled about the pin and attached to the first plate and to the second plate.

The first plate may include an elongated hole, and the pin may extend through the elongated hole.

The second plate may include a tongue. The second plate may include two slots, and the second webbing may extend through each of the two slots. The first webbing may include an end sewn to the first webbing, forming a loop of the first webbing extending through the slots. The seatbelt assembly may include a buckle releasably engageable with the tongue.

The seatbelt assembly may include a retractor coupled to the first webbing. The retractor may be a first retractor, and the seatbelt assembly may include a second retractor coupled to the second webbing.

The first plate may include a slot through which the first webbing extends. The first webbing may include an end sewn to the first webbing, forming a loop of the first webbing extending through the slot. The slot may be a first slot, and the second plate may include a second slot through which the second webbing extends. The seatbelt assembly may include a spring attached to the first plate and to the second plate, and the spring may bias the first plate and the second plate to a relative orientation in which the first slot and the second slot are parallel.

One of the first plate and the second plate may include a stop positioned to impede rotational motion of the first plate relative to the second plate. The stop may be a first stop, one of the first plate and the second plate may include a second stop positioned to impede rotational motion of the first plate relative to the second plate, and the first stop and the second stop may define a range of motion of the first plate relative to the second plate.

The seatbelt assembly may include a spring attached to the first plate and to the second plate, and the spring may bias the first plate and the second plate to a relative orientation in which the other of the first plate and the second plate is spaced from the stop.

A restraint system 42 in a vehicle 30 includes a clip 50 as described below. The clip 50 includes a first plate 52 and a second plate 54 connected by a spring 84. (The adjectives "first" and "second" are used throughout this document as identifiers and are not intended to signify importance or order.) The spring 84 may absorb energy during an impact to the vehicle 30. The clip 50 may reduce pressure exerted on a chest of the occupant by a first webbing 60 during the impact.

With reference to FIG. 1, the vehicle 30 includes a passenger cabin 32 to house occupants, if any, of the vehicle 30. The passenger cabin 32 includes a plurality of seats 34, such as one or more front seats 34 disposed at a front of the passenger cabin 32 and one or more back seats 34 disposed behind the front seats 34. The passenger cabin 32 may also include third-row seats 34 at a rear of the passenger cabin 32. In FIG. 1, the seat 34 is shown to be a bucket seat, but the seats 34 may be other or multiple different types. The position and orientation of the seats 34 and components thereof may be adjustable by an occupant.

Figure 2:
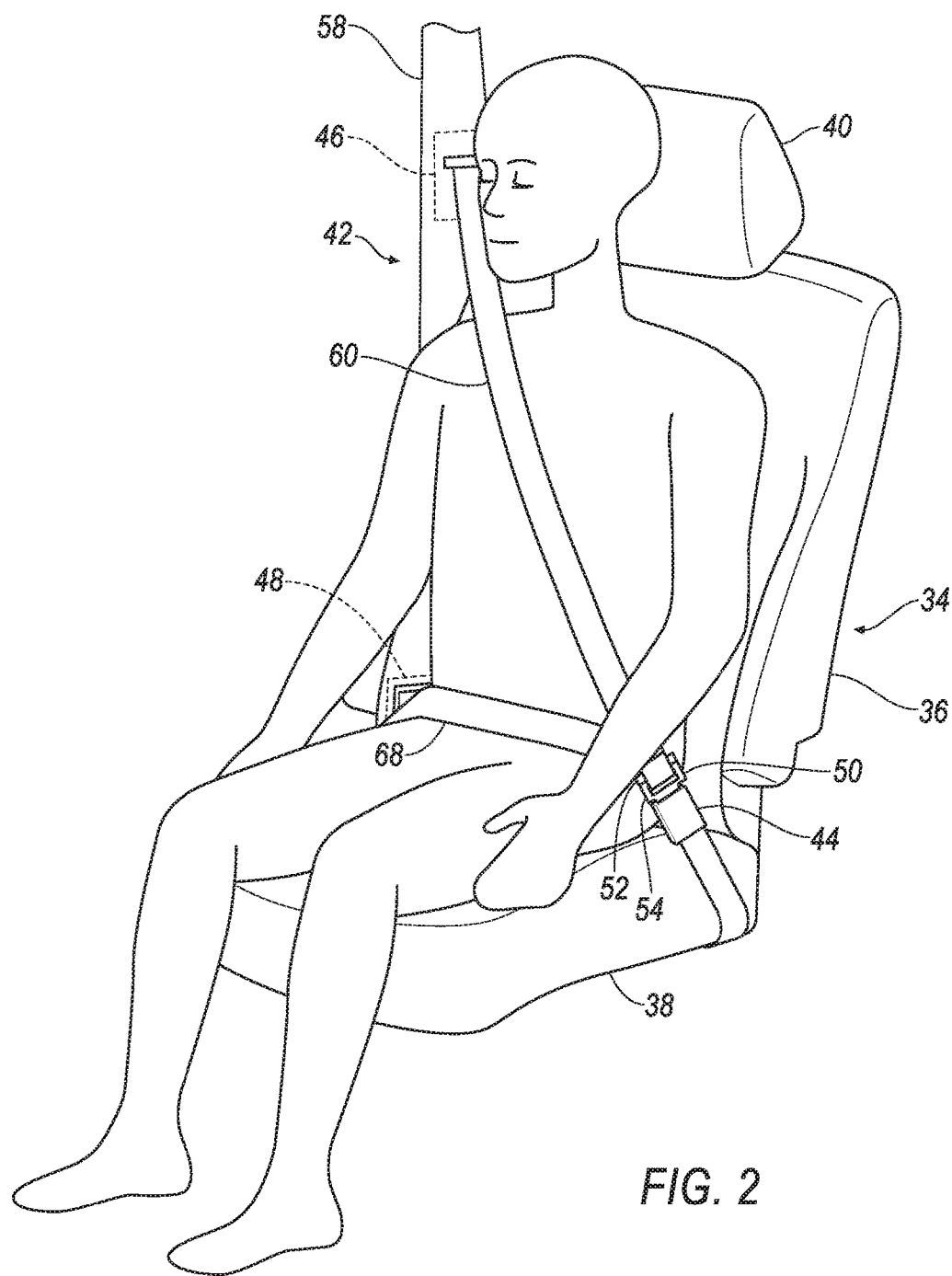
FIG. 2 is a perspective view of the seat and a seatbelt assembly.
Figure 3:
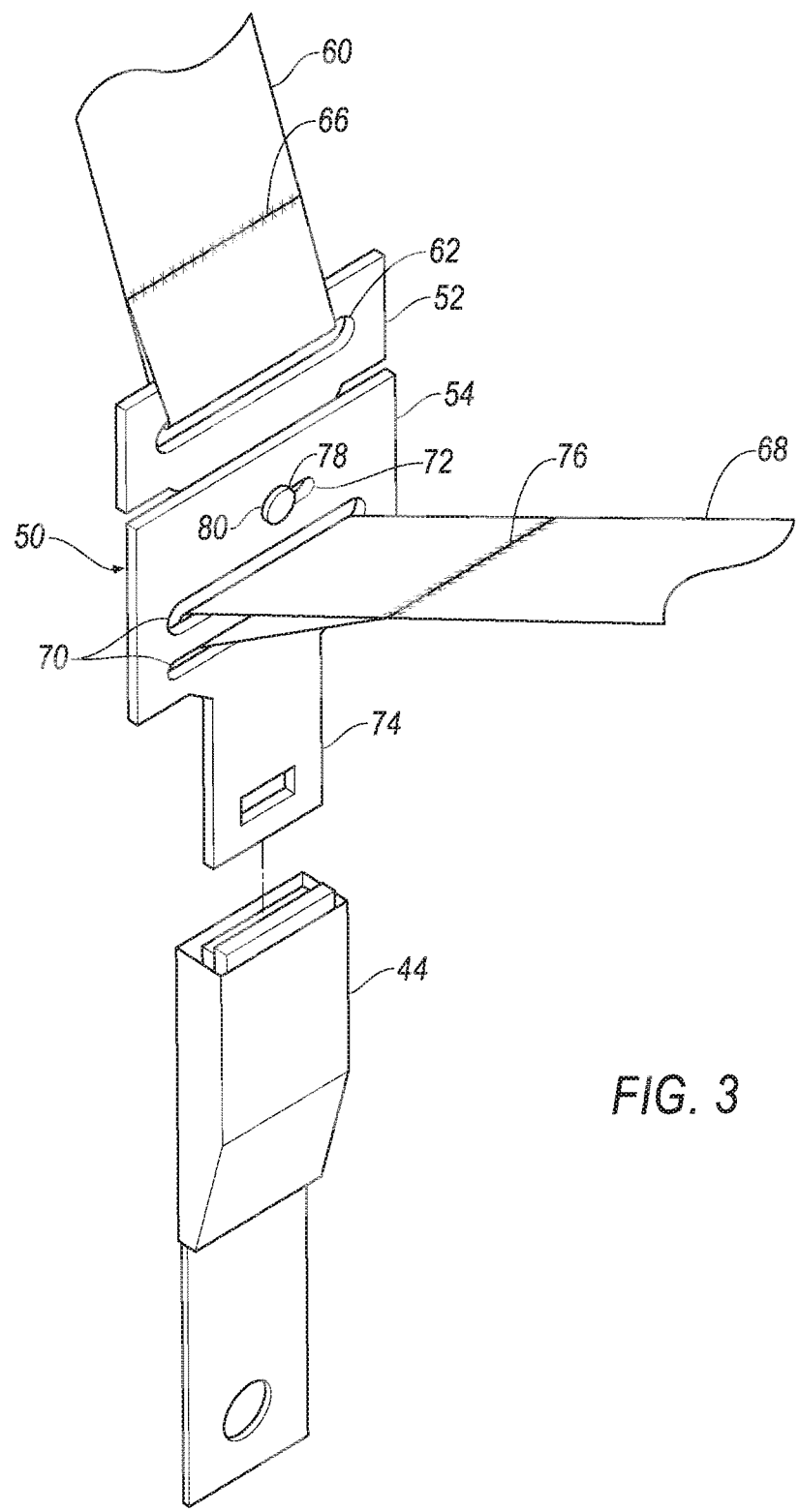
FIG. 3 is a perspective view of a portion of the seatbelt assembly when unbuckled with a shoulder plate of the clip in a relaxed orientation.
Figure 4:
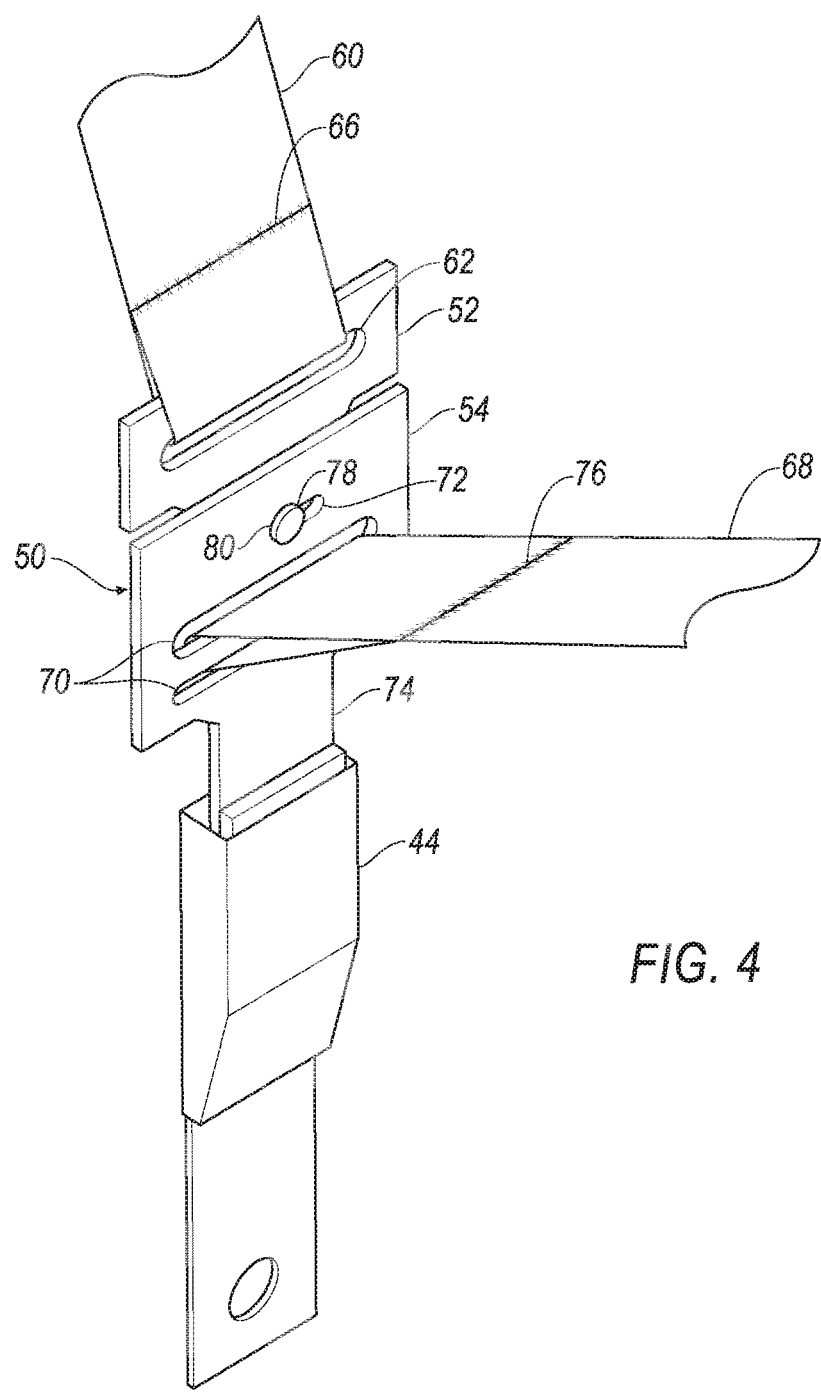
FIG. 4 is a perspective view of the portion of the seatbelt assembly when buckled with the shoulder plate of the clip in the relaxed orientation.
Figure 5:
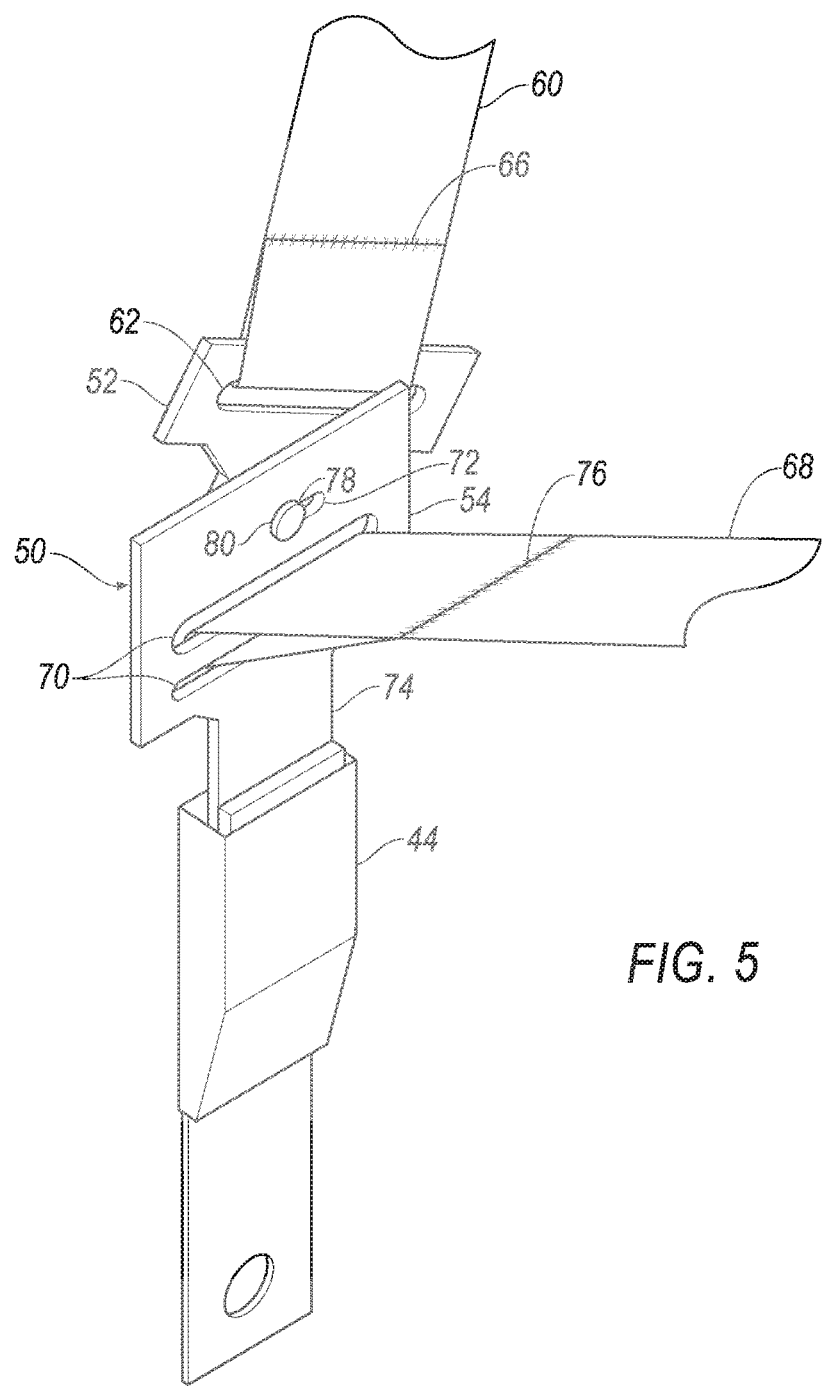
FIG. 5 is a perspective view of the portion of the seatbelt assembly when buckled with the shoulder plate of the clip in a tensed orientation.

With reference to FIG. 2, the seat 34 may include a seatback 36, a seat bottom 38, and a headrest 40. The headrest 40 may be supported by the seatback 36 and may be stationary or movable relative to the seatback 36. The seatback 36 may be supported by the seat bottom 38 and may be stationary or movable relative to the seat bottom 38. The seatback 36, the seat bottom 38, and/or the headrest 40 may be adjustable in multiple degrees of freedom. Specifically, the seatback 36, the seat bottom 38, and/or the headrest 40 may themselves be adjustable, in other words, adjustable components within the seatback 36, the seat bottom 38, and/or the headrest 40, and/or may be adjustable relative to each other.

The vehicle 30 includes the restraint system 42 for each seat 34. The restraint system 42 is a three-point harness, meaning that the restraint system 42 is attached at three points around the occupant when fastened: a buckle 44, a first retractor 46, and a second retractor 48. The clip 50 buckles into the buckle 44. The clip 50 includes the first plate 52 and the second plate 54. The restraint system 42 may, alternatively, include another arrangement of attachment points.

The first retractor 46 may be attached to a body 56 of the vehicle 30, e.g., to a B pillar 58 when the seat 34 is a front seat, to a C pillar (not numbered) when the seat 34 is a back seat. The first retractor 46 may alternatively be mounted to the seat 34. The first retractor 46 includes a spool (not numbered) that retracts and pays out the first webbing 60.

With reference to FIGS. 2-5, the first webbing 60 is elongated from the first plate 52 of the clip 50 to the first retractor 46. The first webbing 60 may be, e.g., a shoulder webbing, i.e., a webbing extending over a shoulder and diagonally across a chest of an occupant of the seat 34. The first retractor 46 is coupled to the first webbing 60, such as attached to and wound about the spool. The first webbing 60 may be formed of fabric, e.g., nylon fabric, in the shape of a strap.

With reference to FIGS. 3-10, the first plate 52 may have a platelike shape, e.g., a substantially constant thickness significantly less than a length and a width. The first plate 52 may include a first slot 62 extending through the thickness of the first plate 52. The first slot 62 may be sized to permit a cross-section of the first webbing 60 to pass through the first slot 62. In other words, the first slot 62 may have a length greater than a width of the first webbing 60 and a height greater than a thickness of the first webbing 60. The first plate 52 includes a first hole 64 spaced from the first slot 62 and extending through the thickness of the first plate 52.

With reference to FIGS. 2-5, the first webbing 60 is attached to the first plate 52. The first webbing 60 extends through the first slot 62 to a first end 66 that is sewn to the first webbing 60, forming a loop of the first webbing 60 extending through the first slot 62.

With reference to FIG. 2, the second retractor 48 may be attached to the body 56 of the vehicle 30, e.g., to the B pillar 58 when the seat 34 is a front seat, to a C pillar (not numbered) when the seat 34 is a back seat. The second retractor 48 may alternatively be mounted to the seat 34. The second retractor 48 includes a spool (not numbered) that retracts and pays out a second webbing 68. The second retractor 48 is a separate component from the first retractor 46; in other words, each restraint system 42 includes two retractors 46,48.

With reference to FIGS. 2-5, the second webbing 68 is elongated from the second plate 54 of the clip 50 to the second retractor 48. The second webbing 68 may be, e.g., a lap webbing, i.e., a webbing extending across hips of an occupant of the seat 34. The second retractor 48 is coupled to the second webbing 68, such as attached to and wound about the spool. The second webbing 68 may be formed of fabric, e.g., nylon fabric, in the shape of a strap. The second webbing 68 is a separate component from the first webbing 60; in other words, each restraint system 42 includes two webbings 60,68.

With reference to FIGS. 3-10, the second plate 54 may have a platelike shape, e.g., a substantially constant thickness significantly less than a length and a width. The second plate 54 may include two second slots 70 each extending through the thickness of the second plate 54. The second slots 70 may each be sized to permit a cross-section of the second webbing 68 to pass through the second slots 70. In other words, the second slots 70 may each have a length greater than a width of the first webbing 60 and a height greater than a thickness of the first webbing 60. The second plate 54 includes a second hole 72 (identified in FIG. 10) spaced from the second slots 70 and extending through the thickness of the second plate 54. The second hole 72 may be elongated. The second hole 72 may have substantially the same width as the diameter of the first hole 64. The second plate 54 includes a tongue 74, and the buckle 44 is releasably engageable to the tongue 74. In other words, the occupant may, e.g., push a button, and the buckle 44 may then disengage from the tongue 74.

With reference to FIGS. 2-5, the second webbing 68 is attached to the second plate 54. The second webbing 68 extends through each of the second slots 70 to a second end 76 that is sewn to the second webbing 68, forming a loop of the second webbing 68 extending through the second slots 70.

With reference to FIGS. 3-10, the first plate 52 and the second plate 54 are rotatably and irremovably coupled to each other. The first plate 52 and the second plate 54 are rotatable relative to each other about an axis A. The axis A may extend through the first hole 64 and the second hole 72, e.g., one end of the second hole 72. For the purposes of this disclosure, "irremovably coupled" means that two components cannot be separated from each other in the normal course of operation by an occupant, i.e., without tools and/or without fracturing components.

Figure 10:
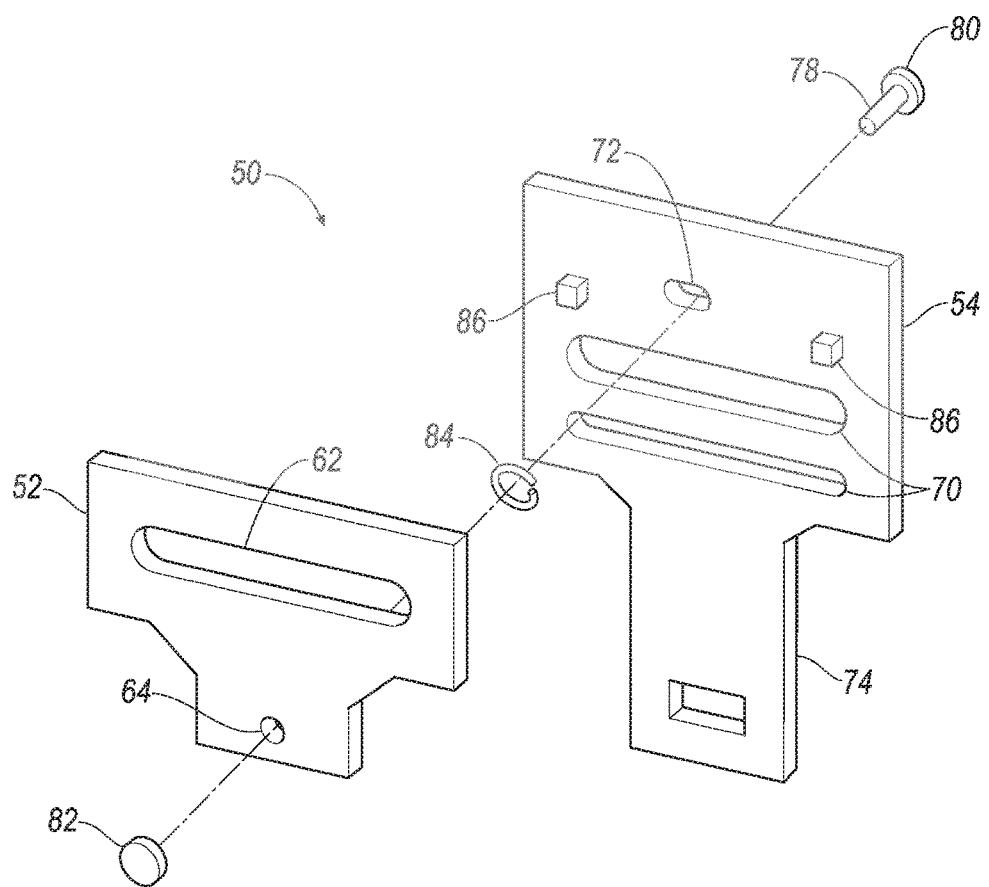
FIG. 10 is an exploded view of the clip.

With reference to FIG. 10, a pin 78 rotatably couples the first plate 52 and the second plate 54. The pin 78 may define the axis A and may extend through the first hole 64 and/or the second hole 72. The pin 78 may be attached and fixed relative to one of the first plate 52 and the second plate 54, may be freely rotatable in the hole of the other of the first plate 52 and the second plate 54, and may have a head 80 disposed on an opposite side of the other of the first plate 52 and the second plate 54 from the one of the first plate 52 and the second plate 54. Alternatively, as shown in FIG. 10, the pin 78 may be freely rotatable in both of the first hole 64 and the second hole 72, the pin 78 may be slidable in the second hole 72, and the pin 78 may include the head 80 and a nut 82 on the opposite side of the clip 50 from the head 80. The head 80 may be wider than a widest width, e.g., the diameter, of the first hole 64 and.

The spring 84 is attached to the first plate 52 and to the second plate 54. The spring 84 may be a torsional spring. The spring 84 may be coiled about the pin 78. The spring 84 may be disposed between the first plate 52 and the second plate 54. The spring 84 has a stiffness, also called the spring constant. The stiffness is sufficiently high that the spring 84 does not substantially elastically deform in response to pressure exerted on the first webbing 60 by voluntary motion of the occupant. The occupant may be, e.g., 50th percentile in stature. The stiffness is sufficiently low that the spring 84 elastically deforms in response to pressure exerted on the first webbing 60 by the occupant during an impact to the vehicle 30, e.g., an oblique impact test conducted as specified by European New Car Assessment Program (NCAP) procedures.

Figure 7:
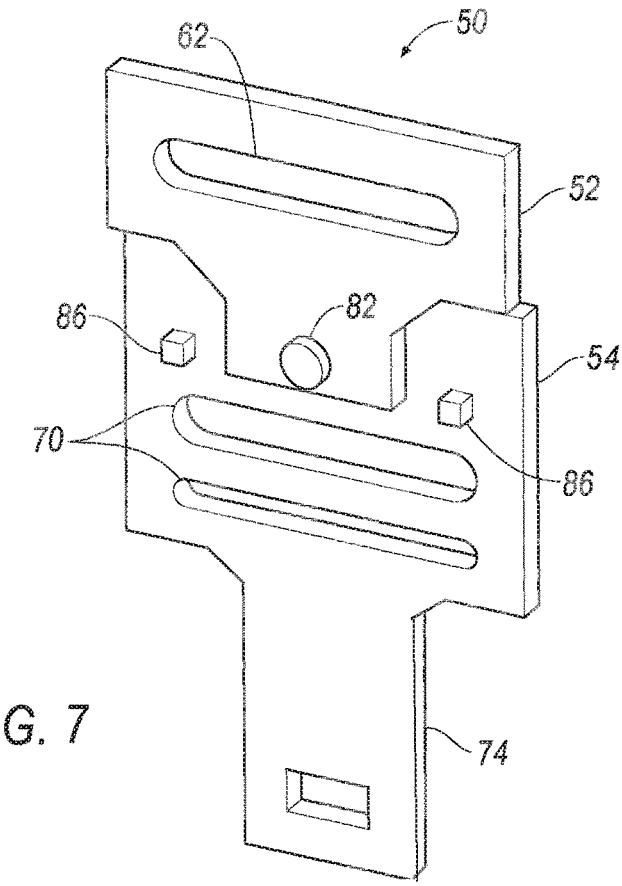
FIG. 7 is a rear perspective view of the clip in the relaxed orientation.
Figure 9:
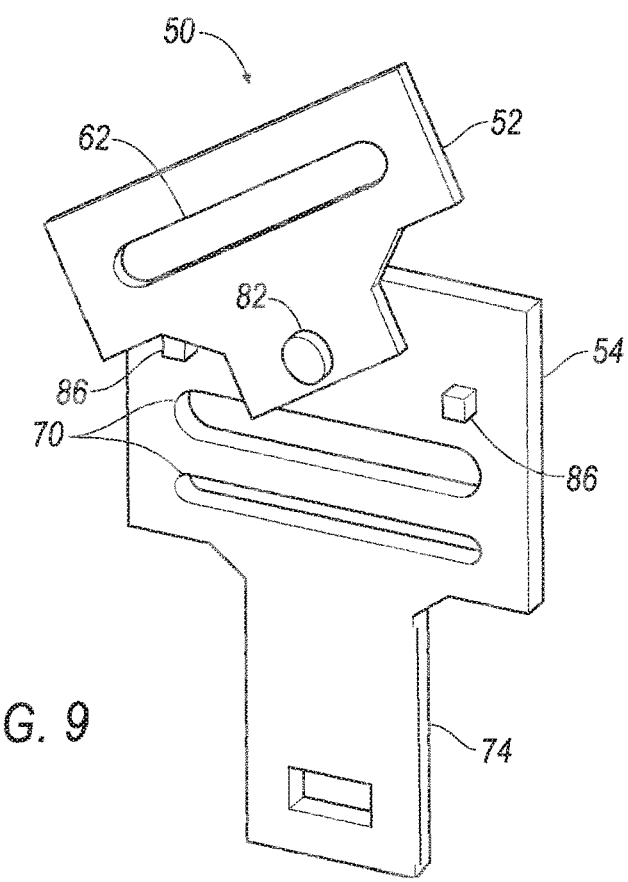
FIG. 9 is a rear perspective view of the clip in the tensed orientation.

With reference to FIGS. 7, 9, and 10, the second plate 54 may include one or more stops 86 positioned to impede rotational and/or translational motion of the first plate 52 relative to the second plate 54. The stops 86 may be protrusions from the second plate 54 that extend farther from the second plate 54 than a distance between the second plate 54 and the first plate 52. The stops 86 may be integral with the second plate 54, i.e., may be a single piece with the second plate 54, or the stops 86 may be separate components attached to the second plate 54. Alternatively, the stops 86 may be protrusions from the first plate 52.

Figure 6:
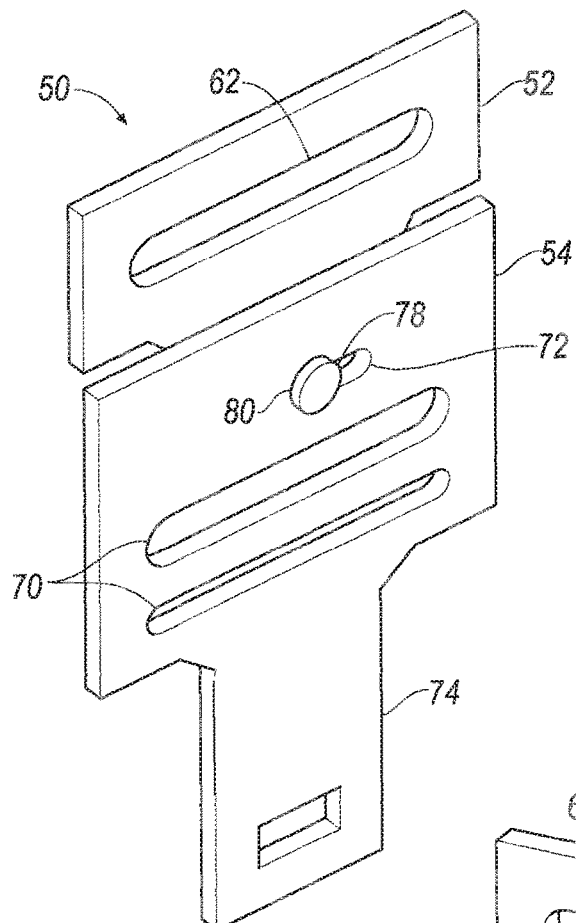
FIG. 6 is a front perspective view of the clip in the relaxed orientation.
Figure 8:
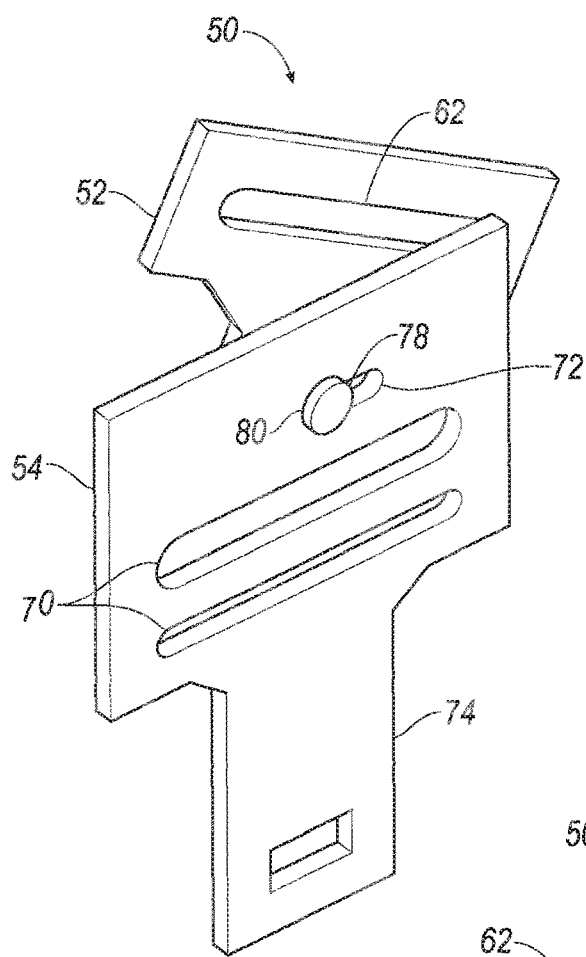
FIG. 8 is a front perspective view of a clip in the tensed orientation.

With reference to FIGS. 6-9, the spring 84 may bias the first plate 52 to an orientation and a position relative to the second plate 54, hereinafter, the relaxed orientation and the relaxed position, as shown in FIGS. 6 and 7. The relaxed position may be such that the pin 78 may be at one end of the hole 72. The first plate 52 in the relaxed orientation and the relaxed position may be spaced from one or all of the stops 86. The stops 86 may define a range of motion of the first plate 52 relative to the second plate 54. The range of motion may be from an orientation and position in which the first plate 52 is contacting one of the stops 86 to an orientation and position in which the second plate 54 is contacting the other of the stops 86, as shown in FIGS. 8 and 9. The spring 84 may absorb energy as the first plate 52 moves away from the relaxed orientation, i.e., from the relaxed orientation toward an orientation contacting one of the stops 86. The spring 84 may absorb energy as the first plate 52 moves away from the relaxed position, i.e., from a position in which the pin 78 is located at one end of the hole 72 toward a position in which the pin 78 is located at the other end of the hole 72.

In the event of an impact to the vehicle 30, an occupant of the seat 34 has momentum pushing toward the direction from which the impact occurred. Given its momentum, the torso pushes against the first webbing 60. The pressure exerted by the occupant against the first webbing 60 twists and slides the first plate 52 relative to the second plate 54. The spring 84 elastically deforms, and the deformation of the spring 84 absorbs energy and may reduce pressure on a chest of the occupant. The first plate 52 may rotate far enough to contact one of the stops 86, which prevents further rotation of the first plate 52.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A seatbelt assembly comprising:
    a first webbing;
    a first plate attached to the first webbing;
    a second plate irremovably coupled to the first plate and rotatable relative to the first plate about an axis;
    a second webbing attached to the second plate; and
    a torsional spring attached to the first plate and the second plate, the torsional spring positioned to apply a torque about the axis to the first plate relative to the second plate, the torque rotationally biasing the first plate about the axis to an orientation relative to the second plate.

2. The seatbelt assembly of claim 1, further comprising a pin rotatably coupling the first plate and the second plate.

3. The seatbelt assembly of claim 2, wherein the first plate includes a hole, the pin extends through the hole, the pin includes a head disposed on an opposite side of the first plate from the second plate, and the head is wider than a widest width of the hole.

4. The seatbelt assembly of claim 2, wherein the torsional spring is coiled about the pin.

5. The seatbelt assembly of claim 2, wherein the first plate includes an elongated hole, and the pin extends through the elongated hole.

6. The seatbelt assembly of claim 1, wherein the second plate includes a tongue.

7. The seatbelt assembly of claim 6, wherein the second plate includes two slots, and the second webbing extends through each of the two slots.

8. The seatbelt assembly of claim 7, wherein the second webbing includes an end sewn to the second webbing, forming a loop of the second webbing extending through the slots.

9. The seatbelt assembly of claim 6, further comprising a buckle releasably engageable with the tongue.

10. The seatbelt assembly of claim 1, further comprising a retractor coupled to the first webbing.

11. The seatbelt assembly of claim 10, wherein the retractor is a first retractor, the seatbelt assembly further comprising a second retractor coupled to the second webbing.

12. The seatbelt assembly of claim 1, wherein the first plate includes a slot through which the first webbing extends.

13. The seatbelt assembly of claim 12, wherein the first webbing includes an end sewn to the first webbing, forming a loop of the first webbing extending through the slot.

14. The seatbelt assembly of claim 12, wherein the slot is a first slot, and the second plate includes a second slot through which the second webbing extends.

15. The seatbelt assembly of claim 14, wherein in the orientation to which the torque from the torsional spring biases the first plate relative to the second plate, the first slot and the second slot are parallel.

16. The seatbelt assembly of claim 1, wherein one of the first plate and the second plate includes a stop positioned to impede rotational motion of the first plate relative to the second plate.

17. The seatbelt assembly of claim 16, wherein the stop is a first stop, one of the first plate and the second plate includes a second stop positioned to impede rotational motion of the first plate relative to the second plate, and the first stop and the second stop define a range of motion of the first plate relative to the second plate.

18. The seatbelt assembly of claim 16, wherein in the orientation to which the torque from the torsional spring biases the first plate relative to the second plate, the other of the first plate and the second plate is spaced from the stop.

19. The seatbelt assembly of claim 1, wherein a spring constant of the torsional spring is sufficiently high that the spring does not substantially elastically deform in response to pressure exerted on the first webbing by voluntary motion of an occupant restrained by the first webbing and by the second webbing.

* * * * *